United States Patent
Ungermann et al.

(10) Patent No.: US 8,407,339 B2
(45) Date of Patent: Mar. 26, 2013

(54) STAR NETWORK AND METHOD FOR PREVENTING A REPEATED TRANSMISSION OF A CONTROL SYMBOL IN SUCH A STAR NETWORK

(75) Inventors: Joern Ungermann, Aachen (DE); Manfred Zinke, Aachen (DE); Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 253 days.

(21) Appl. No.: 12/742,672

(22) PCT Filed: Oct. 17, 2008

(86) PCT No.: PCT/IB2008/054270
§ 371 (c)(1),
(2), (4) Date: May 13, 2010

(87) PCT Pub. No.: WO2009/063346
PCT Pub. Date: May 22, 2009

(65) Prior Publication Data
US 2010/0262689 A1    Oct. 14, 2010

(30) Foreign Application Priority Data
Nov. 14, 2007    (EP) ..................... 07120623

(51) Int. Cl.
*G06F 15/16*    (2006.01)
(52) U.S. Cl. ......... 709/224; 709/223; 709/252; 709/253
(58) Field of Classification Search .......... 709/223–224, 709/252–253
See application file for complete search history.

(56) References Cited

U.S. PATENT DOCUMENTS

| | | | |
|---|---|---|---|
| 4,692,919 A | 9/1987 | West, Jr. | |
| 2003/0067873 A1 | 4/2003 | Fuhrmann et al. | |
| 2003/0093727 A1 | 5/2003 | Belschner et al. | |
| 2004/0081079 A1* | 4/2004 | Forest et al. | 370/216 |
| 2005/0157710 A1 | 7/2005 | Rieckmann | |

FOREIGN PATENT DOCUMENTS
WO    03/069843 A2    8/2003

OTHER PUBLICATIONS
Broster, "An Analyzable Bus-Guardian for Event-Triggered Communication."*

(Continued)

*Primary Examiner* — Andrew Georgandellis (57) ABSTRACT

A star network (1) having a star coupler (14) and at least a first and second network branch (112, 122), wherein each network branch (112, 122) comprises at least one network node (110, 120) and a bus driver (11, 12) connected between the star coupler (14) and the at least one network node (110, 120). A first bus driver (11) of the first network branch (112) is adapted to detect a symbol pattern comprising at least two predetermined equal control symbols, which are transmitted from the first network node (110) to the second network node (120), wherein a control symbol is part of a control pattern. The control pattern is used to force at least the second network node (120) to switch into a predetermined state. The first bus driver (11) is disabling the first network branch (112) from the star network (1) based on whether the transmitted symbol pattern is detected. By using the protection mechanism a reliable detection of babbling idiots is provided. Moreover, in case of detecting such babbling idiots the remaining network nodes are separated and the network can operate without being influenced by the faulty network node.

7 Claims, 3 Drawing Sheets

OTHER PUBLICATIONS

Flexray Consortium; "Flexray, Communication Systems Electrical Physical Layer Specification, Version 2.1, Revision A"; (Dec. 2005).
Barranco, M., et al; "Cancentrate: An Active Star Topology for Can Networks"; Factory Communiction Systems, 2004, Proceedings; Piscataway, NJ, US; IEEE; 10 Pages; (Sep. 22, 2004).

Temple, Christopher.; Avoiding the Babbling-Idiot Failure in a Time-Triggered Communication System; Fault-Tolerant Computing; Twenty-Eighth Annual Internatioanl Sysmposium; 10 Pages; (Jun. 25, 1998).

* cited by examiner

STAR NETWORK AND METHOD FOR PREVENTING A REPEATED TRANSMISSION OF A CONTROL SYMBOL IN SUCH A STAR NETWORK

FIELD OF THE INVENTION

The invention relates to a star network and in particular to a star network having at least two network branches coupled via a star coupler, wherein a bus driver in each network branch is adapted to detect the transmission of a control symbol. Moreover the invention relates to a method for preventing a repeated transmission of a control symbol in such a star network.

BACKGROUND OF THE INVENTION

A typical example for a network is a fault-tolerant time-triggered network comprising at least one communication channel to interconnect at least two network nodes. Such fault-tolerant time-triggered networks are widely used in the automotive area. A star network includes a star coupler and at least two network branches, wherein each network branch at least includes a network node. Such network node could be a sensor or an actuator in such automotive network, wherein information sensed by the sensors needs to be reliably transmitted to the actuator. To increase the safety of cars using such automotive networks the requirements in respect to fault robustness are very high. Moreover, the increasing number of electronic equipment in modern cars requires a well defined behavior of the network independently of the status of single components of the network.

As already mentioned such network includes a plurality of network nodes, wherein each network node includes a bus driver, a communication controller and an application host. Optionally, a network node could include a bus guardian device for further increasing the fault robustness. The bus driver transmits information provided by the communication controller via an output channel to the other network nodes. In turn, the bus driver provides information to the communication controller received via an input channel from the other network nodes. This information is included in data and control symbols, both comprising data bits. In other words, the communication controller is connected to the input and output channel via the bus driver. The communication controller delivers relevant information to and receives information from the application host, and assembles data frames based on the received information for delivering to the bus driver.

Now, the interconnection of the network nodes in the network is described in more detail. All network nodes are interconnected by a predetermined network topology. In the following, a star topology and especially an active star topology will be of interest.

A simple example for an active star topology is to connect all network nodes via a point to point connection to an active star coupler. That is, a simple active star network comprises the active star coupler and the network nodes, which are interconnected respectively to the active star coupler by a point to point connection. The active star coupler receives information from one network node and forwards the information to all other network nodes.

Another example for an active star topology is a cascaded active star topology, in which two single active star networks are connected via a single point-two-point connection.

A further example for an active star topology is a so-called 'hybrid' topology. Therein, also passive busses interconnecting a plurality of network nodes can be connected to an active star network.

The star coupler is one of the core elements of a star network. Each connection point of an active star coupler could be connected to a single network node or a whole sub-network of an arbitrary network topology. A network node or a sub-network connected to a star coupler is called network branch.

Now, the active star coupler of the active star network is described in more detail. Usually the active star coupler is not only responsible for performing forwarding functions. However, it may happen that network nodes of two different network branches simultaneously try to transmit information to the active star coupler. In such case, the active star coupler may be adapted to resolve those situations. Further, bit-reshaping or signal regeneration capabilities may be incorporated into the active star coupler. The active star coupler comprises a plurality of bus drivers interconnected to each other. That is, in a most basic form, a simple logic interconnects these bus drivers to an active star network.

The bus drivers of the active star coupler may also perform simple fault detection functions, as described for example in "FlexRay, Communication Systems Electrical Physical Layer Specification, Version 2.1 revision A, December 2005, FlexRay Consortium". Therein, if the fault detection function of the bus driver detects activity on a connected network branch that is longer than any activity, which is possible in a fault free state, the fault detection function puts the bus driver of the respective network branch into a fail silent node. By this a faulty network branch shall be prevented. Such faulty network branch may be permanently active due to a general hardware fault. However, such faulty network branch may monopolize this network channel and may influence the behavior of the network branches. By using such fault detection, the remaining network branches can still use this network channel for communication in spite of this error, thereby increasing the overall availability of the active star network.

That is, the detection of the faulty network branch in the star network is based on the activity time of the faulty network branch. However, this solution does not prevent the faulty network branch from transmitting wrong information. Usually, an optional bus guardian device is used to detect such wrong information transmitted by a faulty network branch over the active star network. However, such bus guardian is technically complex and a separate component increasing complexity and cost of the whole network.

OBJECT AND SUMMARY OF THE INVENTION

It is therefore an object of the invention to provide a star network interconnecting a plurality of bus drivers with an improved fault detection capability.

The object of the invention is solved by the features of the independent claims.

The invention is directed to detect nodes in a star network, which repeatedly transmit control patterns and/or control symbols. These control symbols and/or control patterns force other network nodes to switch into a predetermined state.

Especially during a start-up phase of such networks predetermined control symbols and/or control patterns having at least one control symbol are used to signal the startup phase. A network node, which is operating faulty during the start-up phase will prevent the whole network from being started.

The invention will be explained in the following based on a time triggered network using the FlexRay communication protocol. However, it is obvious, that the main thought of the invention could be easily applied also to other networks using other protocols for communicating.

During the start-up phase of a network using the FlexRay communication protocol, a predetermined network node transmits a so called wake-up pattern, hereinafter called WUP, as control pattern to force all other network nodes to switch into a listening state, for receiving information. Further, a collision avoidance symbol, hereinafter called CAS, as control symbol is transmitted to all network nodes to force the network nodes to synchronize its transmission timing. However, a network node, called babbling idiot, may repeatedly and arbitrarily transmit such WUPs, CASs or any other control symbol or control pattern over the network and therewith prevent each network node of the star network from completing its start-up.

According to the invention's thought, at least one network node in the star network is adapted to transmit control symbols. This special network node is called control network node. The bus driver supervising the control node is adapted to detect whether a predetermined symbol pattern including at least two predetermined equal control symbols is transmitted by the control network node to the star coupler. The symbol pattern is a predetermined composition of control symbols, which definitely indicates a malfunction of the network branch. In contrast thereto, a control pattern is a composition of control symbols, which could be understood by other network nodes as an information or instruction pattern. Each control symbol can be part of a control pattern. Both, the control symbol and the control pattern may be adapted to force other network nodes to switch into a predetermined state. In case of detecting the transmission of a symbol pattern indicating such malfunction, the bus driver cuts off the network branch from the star network. Therefore, the other network nodes coupled to the star network can reliable switch into the predetermined state instructed by the first control symbol or the first control pattern without being disturbed by a second control symbol or a second control pattern transmitted wrongly by a babbling idiot. If such babbling idiot is transmitting the second control pattern or the second control symbol the bus driver connected between the transmitting network node and the star coupler is detecting the symbol pattern between the first and second control pattern or control symbol.

A star network according to the invention comprises at least a first and a second network branch. The first network branch at least includes a first network node and a first bus driver connected between the first network node and the star coupler. The second network branch at least includes a second network node and a second bus driver connected between the second network node and the star coupler. Based on the thought of the invention, the first bus driver detects, whether a symbol pattern, which includes at least two predetermined equal control symbols is transmitted from the first network node to the star coupler. The first control symbol is at least part of a control pattern, which forces at least the second network node to switch into a predetermined state. Such predetermined state may be a listening state during the start-up phase. Also the second control symbol may be part of a control pattern, which forces at least the second network node to switch into a predetermined state. In case that the transmission of the symbol pattern is detected, the first bus driver disables the first network branch from the star coupler, such that the second control symbol cannot be distributed into the star network. Therewith all other network nodes receiving the first control symbol or the respective first control pattern can switch into the predetermined state instructed by the first control symbol or the first control pattern without being disturbed by the second control symbol or the respective second control pattern. By disabling the network branch including the transmitting first network node after transmitting a first control symbol in a control pattern, a further transmitting of the same control symbol a second time is definitively avoided, since the second control symbol will form or represent the symbol pattern together with the first control symbol, which are both detected by the bus driver as a symbol pattern.

In a preferred embodiment of the invention, the two equal control symbols of the control pattern have a predetermined minimum time distance to each other. This prevents, that the bus driver erroneously recognizes a transmitted control pattern as the symbol pattern and erroneously disables the first network branch from the star network.

Preferably, the two equal control symbols representing the symbol pattern have a predetermined maximum distance to each other. By using the maximum distance between two equal control symbols it is possible to avoid an erroneously detection of a symbol pattern, which would appear, if the second network node was not able to switch into the predetermined state instructed by the first control symbol after a predetermined time interval and the first network node needs to retransmit the first control symbol. Due to the maximum distance between the two equal control symbols it is now possible that the first network node retransmits the control symbol without being detected as symbol pattern.

In a further embodiment, the star network may be a time triggered network. In such a time triggered network all network nodes may transmit according to a predetermined scheduling. For keeping the predetermined scheduling between the network nodes control patterns are used to manage a correct transmission time of each network node.

A preferred embodiment of such time triggered network is using the FlexRay communication protocol. A network using the FlexRay communication protocol is a fault robust-network, which is often used in the automotive area. Therefore, such network usually comprises complex hardware to realize safety relevant features. However, the present invention provides an error detection mechanism, which could be included into the bus driver without the need of further hardware elements. By this additional costs are saved. Moreover, the sensitivity against hardware failures due to a complex structure of the whole network is reduced, since the introduction of a bus driver, which is detecting such wrong symbol patterns, represents a solution simple to realize without increasing the complexity.

Preferably, the star network may be realized as an active star network. In such an embodiment, the detection of control patterns could be performed by a bus driver integrated into the active star coupler of the network. That is, not the bus driver of the network node needs to detect the control pattern, but the bus driver of the active star coupler. This increases the flexibility of the star network, since the bus driver in the star coupler may monitor a plurality of networks nodes in a certain network branch. Moreover, by providing the inventive ability into the bus driver of the star coupler, existing networks could be improved just by changing the star coupler. Thus, not each single network node needs to be equipped with the symbol pattern detecting ability.

In a further embodiment, each of the two control symbols representing the symbol pattern have a predetermined impulse level and a predetermined impulse duration. Thus, the bus driver may detect the impulse of the control symbol based on the predetermined impulse level and on a variable impulse duration, which is longer than an absolute minimum bitrate and shorter than an absolute maximum bitrate supported by the network nodes of the star network. This makes the bus driver flexible for a usage in a plurality of star networks with different bitrates. Thus, the bus driver can be used in a plurality of different star networks, without being individually programmed.

Alternatively, the bus driver detects the impulse of a control symbol based on the predetermined impulse level and on a fixed impulse duration. This prevents an erroneous detection of the symbol pattern. Therefore, the reliability of the protection mechanism in the bus driver is increased.

In a further embodiment, each network branch may comprise a plurality of network nodes, wherein only one network node in the network branch is adapted to transmit control patterns. Now, if a network branch is disabled from the star coupler, no one of the network control nodes adapted to transmit the control patterns will be unnecessarily disabled. In a very simple embodiment, each network branch in the star network may comprise only one network node. Thus, if the network node who is transmitting the control pattern is disabled from the star network after detecting a symbol pattern, no further network node will be disabled from the star network. Thus, the functionality of the star network is not unnecessarily decreased.

In a further embodiment, the first bus driver may start a first count for control symbols, which are transmitted between the two equal control symbols included in the symbol pattern and disables the first network branch from the star network, if the first count has reached a first counter threshold. This enables the protection mechanism to further detect the repetitive and arbitrary transmission of control patterns, which are adapted to force other network nodes to switch into a predetermined state. Such a predetermined state could be a wakeup or a synchronization in time.

Preferably, all control symbols of a symbol pattern should have a predetermined distance in time to each other. This is especially advantageous to differ the symbol pattern from a control pattern. Usually, all control symbols in a control pattern have a predetermined distance in time to each other. If the predetermined time distance of control symbols within a control pattern is excluded during detecting a symbol pattern, it is secured, that the first bus driver will not disable the network branch from the network, in case that a control pattern is transmitted.

Preferably, the first bus driver may increment the first count during a first time interval, which is started upon the transmission of the first of the two equal control symbols representing a symbol pattern. Further, the bus driver may reset the first count after the first time interval has elapsed. The first time interval enables the bus driver to divide the detection of a repetitive transmission of control symbols and a repetitive transmission of control patterns. Only if the first count has reached the first counter threshold during the first time interval, a repetitive transmission of control patterns could be assumed. Otherwise, a repetitive transmission of control symbols must be assumed.

In a further embodiment, the first bus driver may start a second count for the transmission of a control symbol. By introducing a second counter threshold, it could be monitored, whether the second count has reached the second counter threshold. Thus, the intensity of the repetitive transmission of control symbols can be classified.

Preferably, the bus driver may increment the second count during a second time interval, which is started after elapsing the first time interval. This ensures, that none of the control symbols belonging to one control pattern will be taken into account by determining the intensity of the repetitive transmission of control symbols.

Usually, the control symbols are only transmitted during a so-called initialization or start-up phase. This is the time, which is required by all other network nodes to switch into the predetermined state as instructed by the control symbol or the control pattern. This is for example a wake-up instruction or a time-synchronization instruction for the other network nodes. After finishing this start-up phase and starting of the usual data traffic, the protection mechanism according to the invention may be advantageously disabled. Thus, the time and the processing performance in the bus driver for detection of symbol patterns can be saved. Therefore, it is proposed to detect when the initialization phase has been finished. The most suitable way is to detect whether the usual data traffic has been started. This may be realized by three embodiments:

In a first embodiment, the first bus driver may start a third count, wherein the transmission of a symbol is counted, which is unambiguously a data symbol. If the third count is reaching a predetermined third counter threshold, it can be assumed, that the usual data traffic has been started.

In an alternative embodiment, the first bus driver may count the transmission time of the data symbol. Based on the time occupied by the transmitted data symbol and the time not occupied by the data symbol, the first bus driver calculates a so called transmission ratio. Now, if the transmission ratio exceeds a predetermined transmission threshold, it can be assumed, that the usual data traffic has been started.

In a further alternative embodiment, the first bus driver detects, whether data are transmitted over the star network. Then, the first bus driver calculates an activity ratio based on the data transmission time and the idle time. If the activity ratio exceeds a predetermined activity threshold, it can be assumed, that the usual data traffic has been started. This embodiment is based on the thought, that the usual data traffic occupies more transmission time than the initialization phase.

The object is also solved by a method for preventing a repetitive and arbitrary transmission of control symbols or control patterns from a network branch of a star network through the star network. The method includes to determine whether a predetermined symbol pattern has been transmitted. This symbol pattern is represented by two control symbols included in two different control patterns. This is performed by method steps, which are performed by the bus driver as proposed above. Now, in case that the transmission of the symbol pattern is determined, the network branch will be disabled. Therewith, a repetitive and arbitrary transmission of control symbols or control patterns can be prevented.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
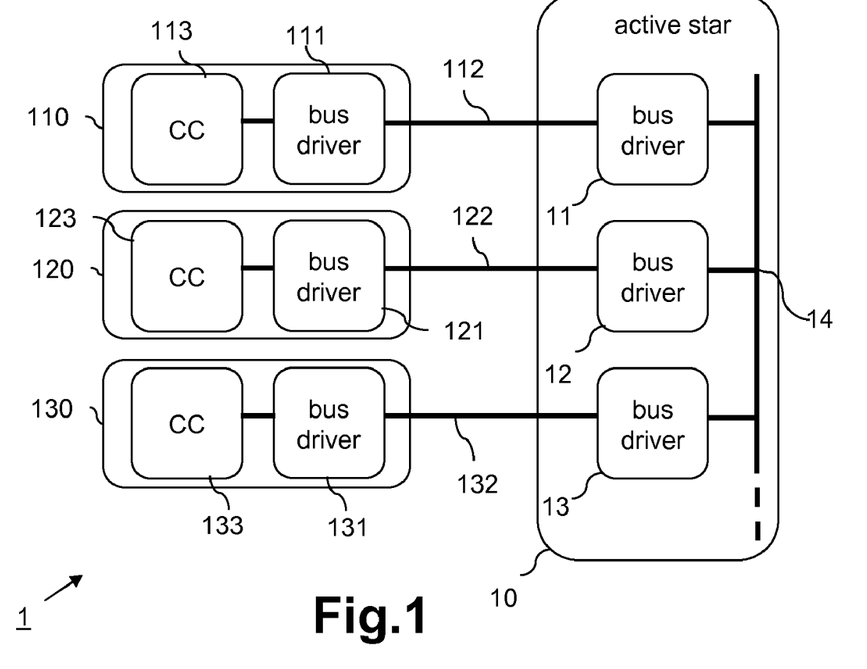
FIG. 1 represents a star network according to the present invention.

FIG. 1 shows a star network 1 having a star coupler 10 and three network branches. The star network 1 is preferably a FlexRay communication cluster 1 and includes three network nodes 110-130 connected via branch connection lines 112-132 to the active star coupler 10. The active star coupler 10 at least includes three star bus drivers 11-13. The presence of further star bus drivers is indicated by a dashed line. The star bus drivers 11-13 are interconnected by a star connector 14. Each of the star bus drivers 11-13 can transmit information to the other star bus drivers 11-13 via the star connector 14. Each of the three network nodes 110-130 includes a node bus driver 111-131, a communication controller 113-133 and an application host. For simplification reasons, the application host is not illustrated in FIG. 1. The application host is connected to the communication controller 113-133 and represents e.g. a sensor, an actuator or a microcomputer, which are receiving and transmitting information to other application hosts included in other network nodes. The communication controller 113-133 is connected to the node bus driver 111-131. As already described, the application host is adapted to provide information to and receive information from the communication controller 113-133. The communication controller 113-133 assembles data frames based on the received information and provides the data frames to the node bus driver 111-131. On the other side, the node bus driver 111-131 provides data frames to the communication controller 113-133, which extracts information out of data frames and provides the information to the application host. The network nodes 110-130 are connected via its respective node bus driver 111-131 to one of the star bus drivers 11-13 in the active star coupler 10 via a branch connection line 112-132, respectively. That is, each node bus driver 111-131 can transmit data frames to or receive data frames from its connected star bus driver 11-13. A star bus driver 11-13, which receives a data frame can pass the data frame to the other star bus drivers 11-13 via the star connector 14. Therewith, each network node 110-130 can communicate to the other network nodes 110-130 connected via the active star coupler 10.

The FlexRay communication cluster 1 is not limited to the topology as shown in FIG. 1. As already mentioned, also a further star network or a passive bus could be connected to the active star coupler 10. For the purpose of controlling the data transmission within the FlexRay communication cluster 1, usually at least one of the network nodes 110-130 is adapted to transmit control symbols or control patterns for forcing other network nodes 110-130 to switch into a predetermined state. In a FlexRay communication cluster control symbols and control patterns for start-up and synchronization of the transmission timing are of special interest. Upon transmission of a control pattern named wake-up pattern, hereinafter called WUP, all network nodes are forced to switch into a state ready for operation. The WUP is composed of a plurality of wake-up symbols, hereinafter WUS. Upon transmission of a control symbol named collision avoidance symbol, hereinafter called CAS, all network nodes 110-130 synchronize their transmission timing based on the reception of the CAS.

Now, the CAS and the WUS are explained in more detail. In the FlexRay communication cluster 1 signals carry information between the network nodes 110-130. These signals may be optical signals, electrical signals or any other suitable signal form to carry information. Each CAS and WUS is a sequence of signal levels (or simply level), wherein each level is kept over a predetermined time interval. The FlexRay communication cluster 1 knows three different levels. An Idle-level, being a zero-level, a Data_0-level being a first predetermined level and a Data_1-level being a second predetermined level. The CAS is a sequence of one Idle-level, one Data_0-level and one Idle-levels. Therein, the Data_0-level must be kept for a certain time interval. The WUS is also a sequence of levels comprising Data_0-levels.

However, the time interval of the Data_0-level in a CAS is usually different from the time interval of the Data_0-level in a WUS.

Next, the start-up of a FlexRay communication cluster 1 is described in more detail. Firstly, a WUP is transmitted to wake up all network nodes 110-130. A network node could switch into a coldstart listening state, in which a network node 110-130 can transmit a CAS or into an integration listening state, in which no CAS could be transmitted. In the present, it should be assumed, that the first network node 110 transmits the WUP. That is, the first network node 110 automatically switches into a coldstart listening state. Further the second network node 120 switches into a coldstart listening state after receiving the WUP. The third network node 130 switches into an integration listening state after receiving the WUP. Now, the first network node 110 transmits the CAS to the other network nodes 120, 130. Next, the first network node 110 transmits a predetermined control pattern several times. Based on the transmitted control patterns the second network node 120 synchronizes its transmission timing. After the second network node 120 has finished the synchronization, both, the first and second network node 110, 120 transmit the control patterns. Based on these control patterns, the third network node 130 synchronizes its transmission timing in the FlexRay communication cluster 1. That is, the transmission of the WUP wakes up the second and third network nodes 120, 130 and the transmission of the CAS synchronizes the transmission of all network nodes 110-130.

However, if the first network node 110 steadily transmits a WUP or CAS to the second and third network node 120, 130, both network nodes will be disturbed in their start-up procedure and can therefore not switch into the usual transmitting state. To solve this problem, the present invention proposes to provide a protection mechanism either in the star bus driver 11-13 or in the node bus driver 111-131.

Figure 2:
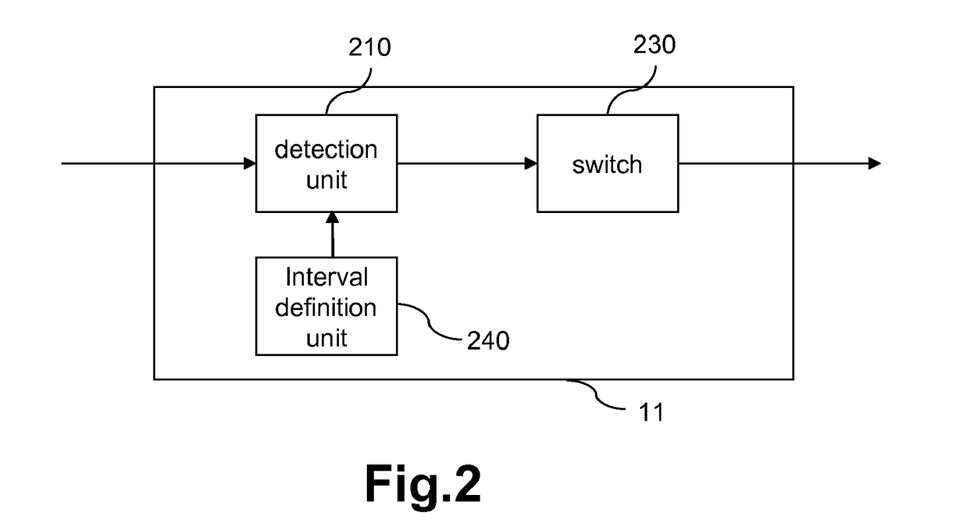
FIG. 2 is a first embodiment of the bus driver for performing the inventive detection ability.

FIG. 2 shows a first embodiment of the bus driver performing the protection mechanism, which is exemplary included into the first star bus driver 11. The protection mechanism at least comprises a detection unit 210 and a switch 230. Preferably, an interval definition unit 240 is connected to the detection unit 210.

It is assumed, that the time interval of the Data_0-level in a CAS encompasses the time interval of a Data_0-level in a WUS. This is naturally given for any bus driver supporting a bitrate of 5 Mbit/s but not given for a bus driver, which only supports a bitrate of 10 Mbit/s.

The detection unit 210 detects whether two control symbols each having a Data_0-levels are transmitted and instructs the switch 230 to disable the first network branch 112 from the FlexRay communication cluster 1. The transmission of the two control symbols each having a Data_0-levels is representing the symbol pattern, for which the bus driver is searching for.

Preferably, the detection unit 210 only instructs the switch 230, if the two Data_0-levels have a sufficient time distance to each other. Usually, the first network node 110 transmits only one CAS to force the other network nodes 120, 130 to synchronize their transmission timing. However, in case of a malfunction, the first network node 110 may arbitrarily and repeatedly transmit the CAS, such that the other network nodes 120, 130 will be disturbed and cannot finish the synchronization of their timing. However, to distinguish this malfunction from the transmission of a WUP, comprising several WUSs with Data_0-levels, it is preferred, that the Data_0-levels in the symbol pattern to be detected have a sufficient distance in time to each other.

Advantageously, only one network node 110-130 connected to each branch connection line 112-132 should be adapted to transmit a WUP or CAS. In such an embodiment of the FlexRay communication cluster 1, no operable control node will be disabled from the network in case of a malfunction.

However, the protection mechanism works best, if one branch connection line 112-132 only includes one network node 110-130 respectively.

The interval definition unit 240 connected to the detection unit 210 defines time intervals, during which the predetermined level of the Data_0-level must be kept by the transmitting first network node 110, such that a transmission of a CAS or WUS is reliably detected. The minimum time interval set by the interval definition unit 240 should be shorter than a bit period belonging to the absolute minimum bitrate and the maximum time interval set by the interval definition unit 240 should be longer than a bit period belonging to the absolute maximum bitrate supported by the FlexRay communication cluster 1. By defining the time intervals in the interval definition unit 240 it is possible to support different bit rates of the FlexRay protocol to reliably detect the symbol patterns. The current FlexRay protocol for the FlexRay communication cluster 1 describes three different bitrates. The length of the time interval of the respective Data_0-level for the CAS and WUS based on the supported bitrate is shown in table 1. Therein, only the highest bitrate is completely specified for the current Flexray protocol. The other bitrates are optional extensions for the future.

TABLE 1

| Bitrate | 2.5 MBit/s | 5 MBit/s | 10 MBit/s |
| --- | --- | --- | --- |
| Minimum CAS length | 11.6 μs | 5.8 μs | 2.9 μs |
| Maximum CAS length | 29.2 μs | 16.2 μs | 9.9 μs |
| Minimum WUS Data_0 length | 6.0 μs | 6.0 μs | 6.0 μs |
| Maximum WUS Data_0 length | 12.0 μs | 12.0 μs | 12.0 μs |

Alternatively, the interval definition unit 240 may define a fixed time interval for the detection unit 210. In such an embodiment of the first star bus driver 11 the switch 230 would not be operated wrongly due to false positives.

Figure 3:
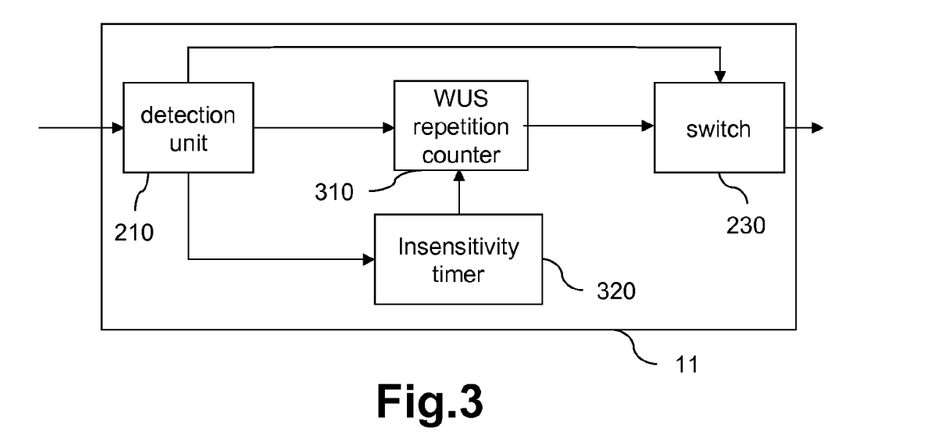
FIG. 3 is a second embodiment of the bus driver according to the present invention.

FIG. 3 shows a second embodiment of the bus driver for realizing the protection mechanism, which is exemplary included into the first star bus driver 11. The protection mechanism comprises the detection unit 210, the switch 230 and a first counter, named WUS repetition counter 310 and connected between the detection unit 210 and the switch 230. Optionally, a first timer, named insensitivity timer 320 is connected between the detection unit 210 and the WUS repetition counter 310 in parallel.

After the detection unit 210 has detected a first Data_0-level, the WUS repetition counter 310 determines whether a WUP babbling idiot is connected to the first star bus driver 11. Therefore, the WUS repetition counter 310 counts all Data_0-levels after the first detected Data_0-level. If a predetermined first counter threshold named WUS repetition threshold is reached, it could be assumed that a WUP babbling idiot is connected to the first star bus driver 11. In this case, the WUS repetition counter 310 instructs the switch 230 to disable the first network branch 112 from the FlexRay communication cluster 1.

Optionally, the insensitivity timer 320 activates the WUS repetition counter 310 during a first time interval named insensitivity interval. The insensitivity interval starts based on the falling edge of the first received Data_0-level detected by the detection unit 210, and is longer than the regular distance of control symbol detection events caused by a regular WUP pattern. In particular the insensitivity interval is longer than the distance between the two falling edges of two consecutive Data_0-levels of a regular WUP-pattern. The insensitivity timer 320 defines a limit time during which a WUS control symbol needs to be received by the first bus driver 11, since the WUS control symbols within a WUP pattern have a predetermined distance amongst each other. In case of receiving a WUS control symbol outside of this insensitivity interval it could be reliably assumed that a CAS babbling idiot is transmitting the control symbols and a disabling of the network branch 112 needs to be performed. This enables the first star bus driver 11 to differ between a WUP babbling idiot and a CAS babbling idiot.

Figure 4:
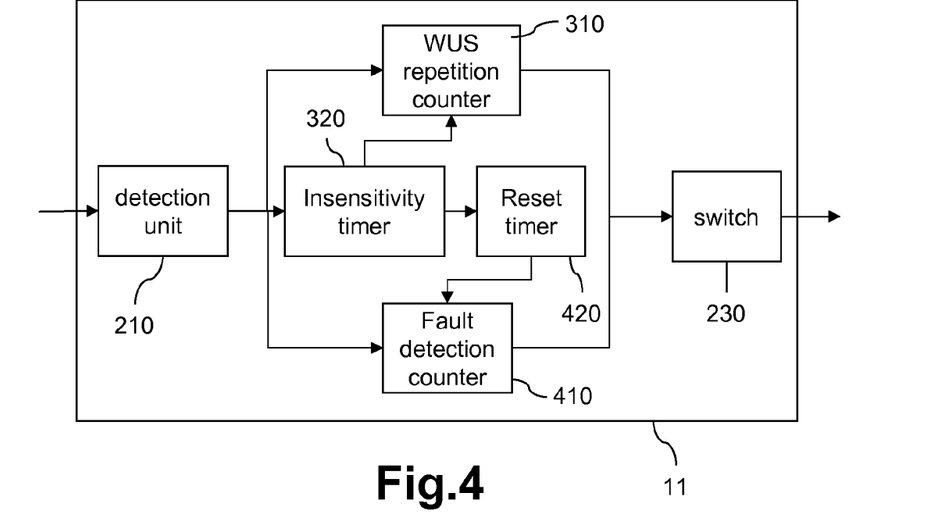
FIG. 4 is a third embodiment of the bus driver according to the present invention.

FIG. 4 shows a third embodiment of a bus driver which is performing the protection mechanism, which is exemplary included into the first star bus driver 11. The present embodiment is an extension of the second embodiment and further includes at least a second symbol counter, named fault detection counter 410, which is connected in parallel to the WUP repetition counter 310. Preferably, a second symbol timer, named reset timer 420 is connected between the insensitivity timer 320 and the second symbol counter 410. However, in contrast to the second embodiment, in the third embodiment the detection unit 210 does not directly instruct the switch 230 to disable the first network branch 112 from the FlexRay communication cluster 1. Therefore, there is no direct connection between the detection unit 210 and the switch 230. In the first star bus driver 11 of the third embodiment a higher number of Data_0-levels in the symbol pattern for reliably detecting a CAS babbling idiot can be adjusted. That is, the first star bus driver 11 may be set up to not disable the first network branch 112 from the FlexRay communication cluster 1 until a symbol pattern comprising more than two Data_0-levels is detected. Therefore, the fault detection counter 410 counts the detected Data_0-levels after the insensitivity interval of the insensitivity timer 320 has expired. The intensity interval ensures, that no Data_0-levels belonging to a WUP will be taken into account to determine the symbol pattern indicating the presence of a CAS babbling idiot. If the number of detected Data_0-levels in the fault detection counter 410 exceeds a second counter threshold, named fault detection threshold, the fault detection counter 410 will instruct the switch 230 to disable the first network branch 112 from the FlexRay communication cluster 1. Therewith, errors can be ignored by the first star bus driver 11, which are not regarded as hazardous to the start-up of the FlexRay communication cluster 1.

The reset timer 420 may be provided to reset and disable the fault detection counter 410 after a second time interval named reset interval has expired. The reset timer 420 is suited to secure, that the protection mechanism will be disabled after the start-up of the FlexRay communication cluster 1 is finished. However, the disabling of the protection mechanism with the reset timer 420 depends on a fixed time.

Figure 5:
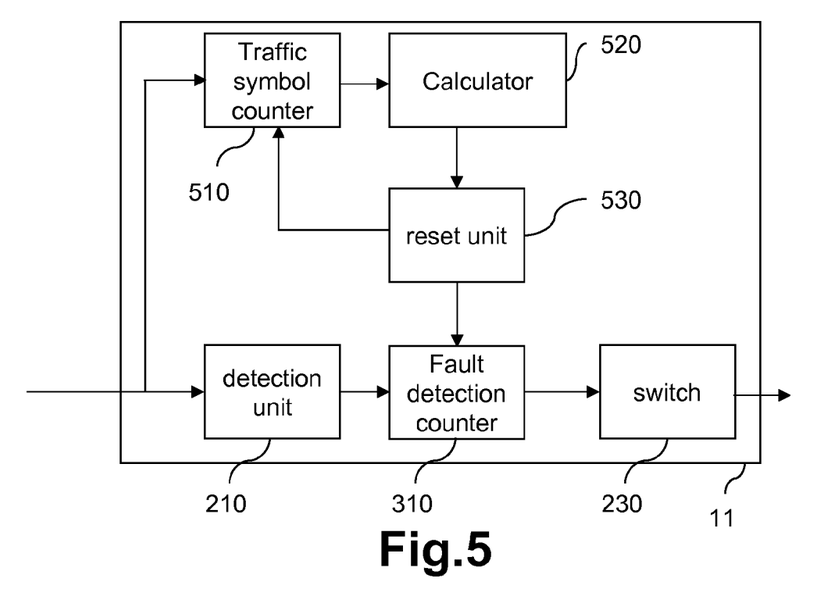
FIG. 5 is a fourth embodiment of the bus driver according to the present invention.

The fourth and fifth embodiment of the present invention represent a mechanism to detect the completion of the start-up of the FlexRay communication cluster 1. FIG. 5 shows the fourth embodiment, which is also exemplary included into the first star bus driver 11. The first star bus driver 11 comprises the detection unit 210, the fault detection counter 410, the switch 230, a third counter, named traffic symbol counter 510, a calculator 520 and a reset unit 530. The detection unit 210, the fault detection counter 410 and the switch 230 are connected in series. The traffic symbol counter 510 is connected to the calculator 520 and the reset unit 530. The calculator 520 is also connected to the reset unit 530. The reset unit 530 is connected to the fault detection counter 410. In operation, the detection unit 210 detects the transmission of a Data_0-level as mentioned above and signals the presence of a Data_0-level to the fault detection counter 410, which instructs the switch 230 to disable the first network branch 112 from the FlexRay communication cluster 1 if the number of transmitted Data_0-levels exceeds the fault detection threshold. The fourth embodiment is based on the thought, that a start-up phase is finished, when data traffic is reliably detected. In a simple embodiment for usual traffic detection, the traffic symbol counter 510 counts the occurrence of a Data_1-level. This is based on the thought, that Data_1-levels are only used to transmit usual data but no control symbols and control patterns like WUP or CAS. If the traffic symbol counter 510 exceeds a third counter threshold, it can be assumed, that the usual data traffic has been started such that the traffic symbol counter 510 instructs the reset unit 530 to reset and disable the fault detection counter 410.

In a more suitable embodiment, the traffic symbol counter 510 passes the counted Data_1-levels to the calculator 520. Based on the knowledge of the length of one detected Data_1-level, the calculator 520 determines, which transmission time is occupied by a Data_1-level. Now, the calculator 520 calculates a transmission ratio, based on the time occupied by Data_1-levels and the time not occupied by Data_1-levels. If this transmission ratio exceeds a predetermined transmission threshold, the calculator 520 instructs reset unit 530 to reset and disable the fault detection counter 410.

Figure 6:
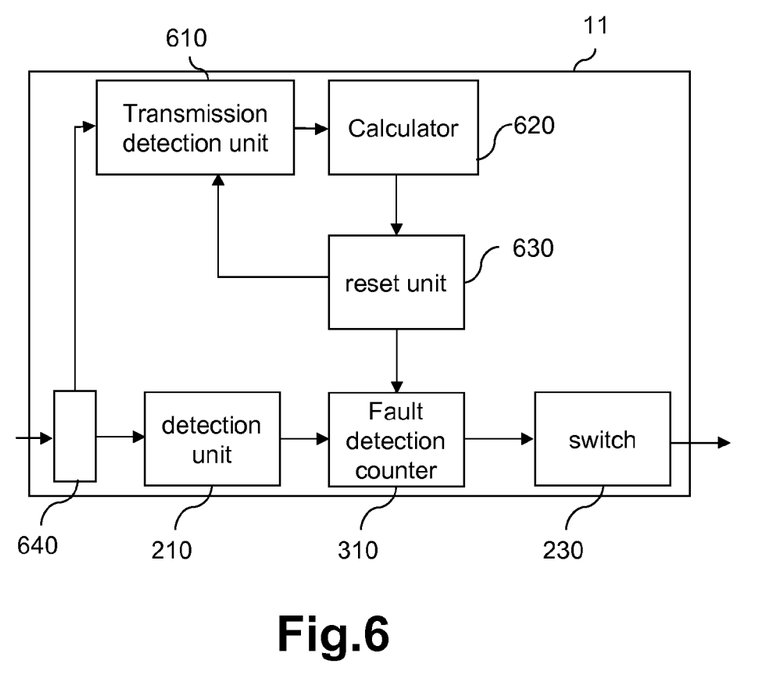
FIG. 6 is a fifth embodiment of the bus driver according to the present invention.

FIG. 6 shows a fifth embodiment, which is exemplary included into the first star bus driver 11. Therein, the first star bus driver 11 includes the detection unit 210, the fault detection counter 410, the switch 230, a transmission detection unit 610, a calculator 620, a reset unit 630 and a data port 640. The detection unit 210 connected to the data port 640 detects the transmission of Data_0-levels as described above and outputs a detected positive to the fault detection counter 410, which counts the transmitted Data_0-levels and instructs the switch 240 to disable the first network branch from the FlexRay communication cluster 1 if the number of transmitted Data_0-levels exceeds the fault detection threshold. The transmission detection unit 610 detects a transmission activity at the data port 640 and passes the detected activity to the calculator 620. The calculator 620 determines an activity ratio based on the time, which is occupied by the transmission activity and an idle time, during which no activity is detected. If the activity ratio exceeds a predetermined activity threshold, the calculator 620 instructs the reset unit 630 to reset and disable the fault detection counter 410.

By using the protection mechanism a reliable detection of babbling idiots is provided. Moreover, in case of detecting such babbling idiots the remaining network nodes are separated and the network can operate without being influenced by the faulty network node.

What is claimed is:

1. Star network having a star coupler and at least a first and second network branch, wherein each network branch comprises at least one network node and a bus driver connected between the star coupler and the at least one network node, wherein the bus driver of the first network branch is adapted:
to detect a symbol pattern comprising at least two predetermined equal control symbols transmitted from the at least one network node of the first network branch toward the at least one network node of the second network branch, wherein each control symbol is adapted to force the at least one network node of the second network branch to switch into a predetermined state, and
to disable the first network branch from the star network, after transmission of the first control symbol to the at least one network node of the second network branch and before transmission of the second control symbol to the at least one network node of the second network branch, in response to detection of the at least two equal control symbols within a predetermined minimum and/or maximum distance in time to each other.

2. Star network according to claim 1, wherein the star network is adapted to operate based on the FlexRay communication protocol.

3. Star network according to claim 1, wherein the bus driver of the first network branch is adapted to start a first counter for the predetermined control symbols transmitted between the two equal control symbols and having a predetermined distance in time to each other, to proceed the first counter during a first time interval, wherein the first time interval is started based on the detection of a first of the two equal control symbols to disable the first network branch from the star network based on whether the first counter has reached a predetermined first counter threshold, and to reset the first counter for the predetermined control symbol after elapsing of the first time interval.

4. Star network according to claim 1, wherein the bus driver of the first network branch is adapted to detect a usual data traffic and to disable the detection of a symbol pattern after detecting the usual data traffic.

5. Star network according to claim 3, wherein the bus driver of the first network branch is adapted to start a second counter for a data symbol transmitted from the first network node connected to the bus driver of the first network branch, to calculate a transmission ratio based on a time occupied by the data symbol and/or a time not occupied by the data symbol, to reset the first and second counters, based on whether the transmission ratio has reached a predetermined activity threshold.

6. Star network according to claim 3, wherein the bus driver of the first network branch is adapted to determine active data traffic from one of the network branches to the star coupler, to calculate an activity ratio based on a data transmission time and an idle time,
and to reset the first counter based on whether the activity ratio has reached a predetermined activity threshold.

7. Method for preventing a repeatedly transmission of a control symbol between at least a first and a second network branch in a star network having a star coupler, wherein each network branch comprises at least one network node and a bus driver connected between the star coupler and the at least one network node, the method comprising the following steps performed by the bus driver of the first network branch:
detecting a symbol pattern comprising at least two predetermined equal control symbols transmitted from the at least one network node of the first network branch toward the at least one network node of the second network branch, wherein each control symbol is adapted to force the at least one network node of the second network branch to switch into a predetermined state; and
disabling the first network branch from the star network, after transmission of the first control symbol to the at least one network node of the second network branch and before transmission of the second control symbol to the at least one network node of the second network branch, in response to detection of the at least two equal control symbols within a predetermined minimum and/or maximum distance in time to each other.

* * * * *